Patented June 17, 1952

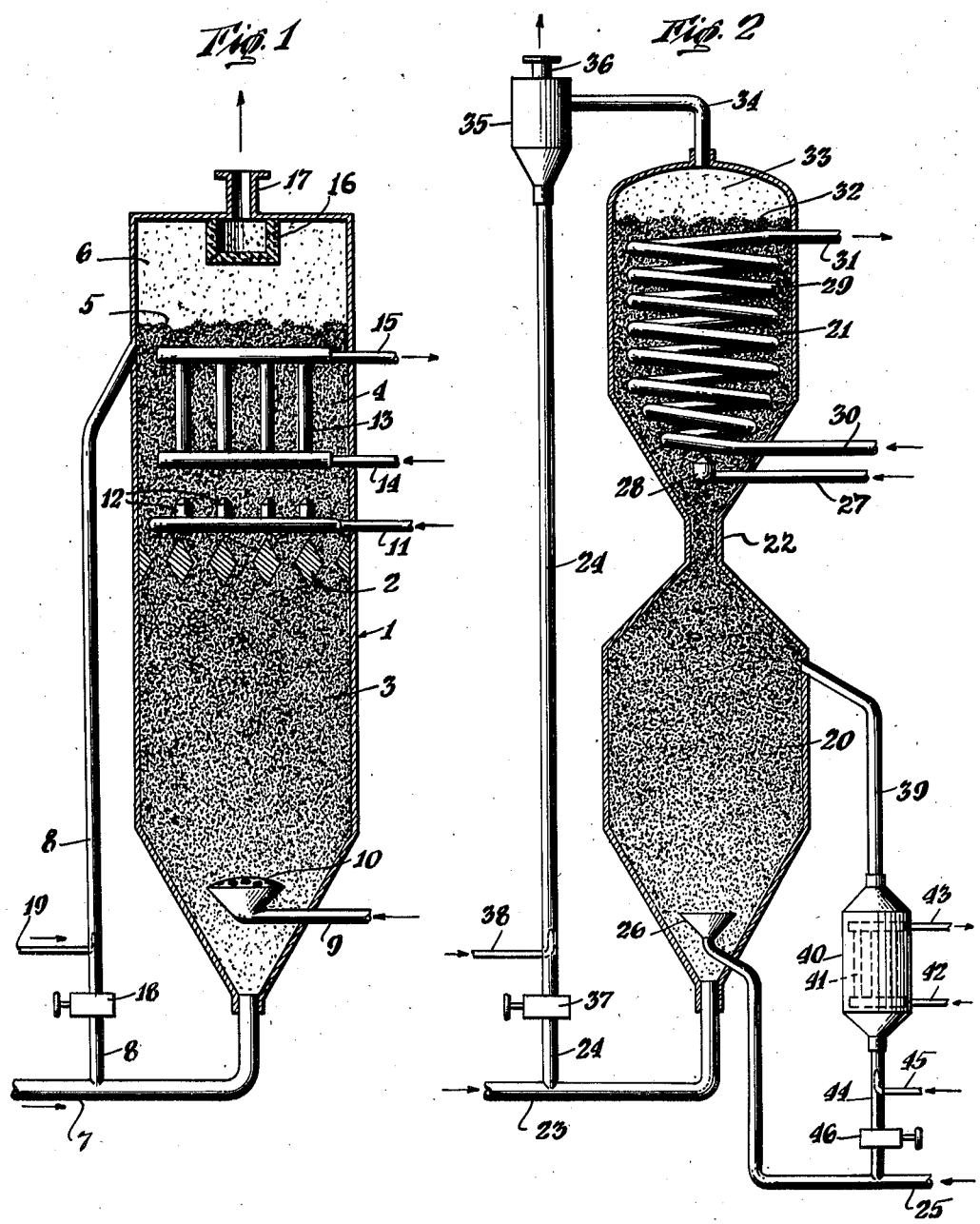

2,600,444

UNITED STATES PATENT OFFICE 2,600,444

OXYGENATION OF OLEFINS

Frederick W. Sullivan, Jr., Summit, N. J.

Application July 20, 1946, Serial No. 685,045

10 Claims. (Cl. 260—348.5)

This invention relates to the oxygenation of olefins and more particularly to the catalytic vapor-phase conversion of ethylene, propylene, etc., to the corresponding oxides.

In recent years the manufacture of ethylene oxide has steadily grown in commercial importance because of its wide use as raw material in the preparation of organic products including glycol, plasticizers, resins and surface active agents. In spite of the large market for ethylene oxide and the many processes that have been proposed for the manufacture of this product, no process has been found free of the handicaps and limitations characteristic of current operations, among these being cumbersome and expensive reactors, high dilution of the reaction gases and low conversions.

An object of the present invention is to provide a process for making ethylene oxide and similar olefin oxides in simple equipment having no size restrictions but capable of sensitive control of the reaction.

Another important object is to circumvent in a practical way unnecessary dilution of the reactants without encountering the dangers of a runaway reaction and explosion.

Still another object is to operate at high rates of throughput with high conversions.

These and additional objects of the invention will become evident from the description which follows.

In accordance with this invention, olefins such as ethylene and propylene are converted to the corresponding oxides by direct vapor-phase reaction with oxygen in the presence of a fluidized mass of silver catalyst under carefully controlled reaction conditions. While the activities of the various catalysts which may be employed will dictate different reaction temperatures, I have found it advantageous to use silver catalysts of high activity, as known to those skilled in the art, at reaction temperatures in the range of 200° to 300° C., and preferably 220° to 260° C. The catalyst may be in the form of massive silver particles with or without suitable promoters or activators like platinum, gold, manganese, and alkaline earth metal compounds, or such catalyst may be supported on fine particles of a carrier, e. g., finely divided refractory alumina.

To achieve the ends of my invention, it is essential to avoid unnecessary dilution of the gaseous reactants by the addition of steam, carbon dioxide and the like. Furthermore, it is important to bring the two reactants together without using a large excess of either one, which heretofore has been practiced to effect dilution of the highly exothermic reactants without introducing extraneous diluents like carbon dioxide.

While air may be used to provide the oxygen for this process, it is advantageous to utilize oxygen in a more concentrated form, say, oxygen-enriched air obtained by air rectification and containing at least 35% by volume of oxygen. Preferably, oxygen of at least about 95% purity is used in the oxygenation of olefins by this invention. Similarly, while any gaseous fraction containing ethylene and similar olefins, like the gaseous fraction obtained from catalytic cracking or reforming operations, may be employed in the production of valuable olefin oxides, it is desirable to select fractions having an olefin content of over 50% by volume.

Theoretically, the oxygenation of ethylene proceeds according to the reaction:

$$1C_2H_4 + 0.5O_2 \rightarrow 1C_2H_4O$$

However, the conventional processes with which I am acquainted inevitably involve a substantial consumption of the ethylene in undesired side reactions including complete oxidation according to the equation:

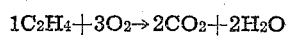

$$1C_2H_4 + 3O_2 \rightarrow 2CO_2 + 2H_2O$$

It is obvious that the last reaction consumes six times the amount of oxygen required to form ethylene oxide. By my process it is possible for the first time to curtail the quantity of olefin that is completely oxidized to less than about 10% of the ethylene converted in the reaction. Not only is this highly significant commercially in terms of improved yields but also it becomes economically feasible to use oxygen-rich fractions since the waste of oxygen in undesired side reactions is materially decreased. For efficient operation of the present process, I find it advisable to control the ratio of reactants so that for each volume of ethylene or like olefin not more than 1.0 volume, preferably not more than 0.75 volume, of oxygen is provided to the catalytic reaction zone.

For more detailed description and further clarification of this invention, reference is made to the accompanying drawing in which:

Figure 1 is a sectional elevation schematically showing a preferred form of apparatus for conducting my process; and Figure 2 is a sectional elevation representing an alternative arrangement of apparatus suitable for carrying out the invention.

Referring to Figure 1, an elongate vessel 1 has a series of baffles or a grate 2 forming two contiguous zones 3 and 4 within vessel 1. The vessel contains a fluidized mass of powdered silver catalyst completely filling the contiguous zones 3 and 4 and terminating at the pseudo-liquid level 5, i. e., the level at which the reaction gases become disengaged from the bulk of the catalyst powder. The topmost portion of vessel 1 forms a settling space 6 wherein any entrained catalyst particles tend to settle out of the reaction gases emerging from level 5.

In operation, one of the reactants, say, ethylene, is supplied through pipe 7 to the lower or reaction zone 3 in vessel 1. The inflowing stream of ethylene conveys in suspension into the reaction zone 3 powdered catalyst discharging pipe 7 from standpipe 8 as hereinafter described. At the same time, the other reactant, say, oxygen, enters the reaction zone 3 through a perforated distributor 10 fed by pipe 9. The reactants are quickly and thoroughly mixed within reaction zone 3. The reacting gases flow up through zone 3, maintaining a well fluidized condition in the catalyst mass, and without discontinuity in the fluidized phase the reaction gases pass through the restrictions of grate 2 into the upper or quenching zone 4. The hot reaction gases are immediately quenched or cooled to stop undesired side reactions by either the direct injection of a coolant through pipe 11 and nozzles 12 or indirect heat exchange with a bank of tubes 13 through which a cooling medium flows by way of inlet 14 and outlet 15. Both cooling means may be employed if desired. The temperature of the gases flowing through the fluidized mass of catalyst surrounding the cooling tubes 13 is reduced to a level which not only promptly terminates reaction but also eliminates explosion hazards thus facilitating the further treatment or use of the gaseous reaction product. The thus cooled reaction gases are permitted to emerge from the fluidized mass of silver catalyst at pseudo-liquid level 5; the gases rise through space 6 within entrained catalyst particles tend to settle out. Removal of entrained particles is completed with a suitable separator, for example, a porous Alundum filter 16. The dust-free reaction gases are safely withdrawn through outlet pipe 17 for further utilization as desired.

A standpipe 8 connected with cooling zone 4 serves to convey cooled catalyst to pipe 7 wherein, as hereinbefore mentioned, the catalyst is carried in suspension by the ethylene stream flowing into reaction zone 3. The transfer of catalyst from upper zone 4 to lower zone 3 is controlled by slide valve 18 or its equivalent. Tube 19 is used to introduce gas into standpipe 8 to maintain the catalyst therein in a free-flowing condition. For such purpose, steam, air, carbon dioxide, methane, etc., may be employed. It is therefore apparent that the powdered catalyst is continuously circulated through the apparatus by flow up through reaction zone 3, grate 2, cooling zone 4, down through standpipe 8 and valve 18, and through pipe 7 for return to reaction zone 3. Furthermore, it is clear that by proportioning the quantity of circulated catalyst to the quantity of heat released in reaction zone 3 the reaction temperature is easily and closely maintained at the desired optimum level.

Figure 2 illustrates an alternative form of apparatus comprising two contiguous zones 20 and 21 communicating with one another through the restricting duct 22. Premixed reactants, for example, ethylene and oxygen, flow through inlet pipe 23 into the lower or reaction zone 20, carrying in suspension powdered catalyst discharged into pipe 23 from standpipe 24 as described hereafter. The oxygenation reaction proceeds from the instant that the reactants reach the reaction zone and the reaction gases flow upwardly maintaining fluidization of the catalyst powder and passing through duct 22 into the upper or cooling zone 21. Therein the mass of fluidized catalyst and the reaction gases are maintained at a temperature substantially below the reaction temperature prevailing in lower zone 20. The drop in temperature is effected by direct quenching as by flashing water to steam by injection through pipe 27 and nozzle 28, or by indirect heat exchange with a coolant flowing through coil 29 by way of inlet 30 and outlet 31. The cooled reaction gases become disengaged from the bulk of the fluidized catalyst at pseudo-liquid level 32 without danger of explosion and rise through space 33 to discharge through outlet pipe 34. Entrained particles of catalyst are removed from the reaction gases in cyclone separator 35 so that substantially dust-free gases leave through pipe 36 for further treatment or recovery as desired. The separated catalyst powder drops from cyclone 35 into standpipe 24 whence it discharges into pipe 23. The flow of catalyst through standpipe 24 is regulated by valve 37. Fluidizing gas enters through tube 38 to keep the catalyst from clogging standpipe 24. For this purpose, a gas velocity of the order of 0.1 foot per second up through the standpipe is generally satisfactory.

As in the case of the apparatus of Figure 1, the present apparatus is operated with continuous circulation of powdered catalyst, the chief difference being that somewhat higher gas velocities are used in zone 21 than in zone 4. Thus, with a given catalyst powder requiring a gas velocity of, say 0.6 to 1.2 feet per second through zone 4, it would generally be advisable to employ a velocity of 1.5 to 2.5 feet per second through zone 21 to promote a desired amount of catalyst entrainment by which, in turn, circulation of catalyst through the contiguous zones 20 and 21 is effected.

While premixed reactants may be fed to the reactor 20 by way of pipe 23, the reactants may be separately charged by providing an additional inlet pipe. In this connection, Figure 2 includes an advantageous modification comprising a second inlet pipe 25 for one of the two reactants, a discharge opening 26 in reaction zone 20, a standpipe 39, a cooling vessel 40, another standpipe 44, a gas inlet tube 45 and a flow-control device 46. Operating with separate injection of the reactants into reactor 20, one reactant would serve to circulate catalyst through the contiguous zones 20 and 21 and standpipe 24, while the other would promote circulation through zone 20 and cooling vessel 40 which is provided with heat exchange tubes 41 connected with inlet 42 and outlet 43 for the flow of a cooling medium therethrough. Those skilled in the art will appreciate that the double circulation of catalyst through cooling zones 21 and 40 makes it possible to use one of these cooling zones as a vernier control in the maintenance of a desired optimum temperature in reaction zone 20.

To exemplify the invention more specifically, an ethylene gas fraction containing approximately 80% by volume of ethylene and the remainder comprising essentially ethane, methane and hydrogen is supplied to the reaction zone along with a stream of oxygen of about 98% purity. The reactants are proportioned so that there is 0.7 volume of oxygen for each volume of ethylene in the feed. The contiguous reaction and cooling zones are filled with a fluidized mass of catalytic silver powder, all of which passes through a 200 mesh screen and only 10% of which is retained on a 325 mesh screen. The reaction gases flow up through the reaction zone at a velocity of 1.4 feet per second and through the cooling zone at a velocity of 1.1 feet per second. Contact time within the reaction zone is 3.2 seconds. With the indicated gas flow the silver powder is maintained in a well fluidized state. Water is circulated through a heat exchanger disposed in the cooling zone to keep the temperature of the zone at 140° C. and catalyst at this temperature is continuously transferred from the cooling to the reaction zone. In this manner, by controlling the flow of cool catalyst the reaction zone is kept at a temperature of 240° C.; it is observed that the temperature of the reaction zone shows insignificant or no variation over prolonged periods of operation. The ethylene oxide recovered from the effluent reaction gases shows a yield of 78%.

In another example of the process, a hydrocarbon gas containing by volume 65% ethylene, 23% propylene and the remainder consisting chiefly of ethane, methane and hydrogen is oxygenated with a stream containing 40% oxygen obtained by rectification of liquid air. The olefin to oxygen ratio of the feed is 1.0 to 0.8. The catalyst is in the form of silver deposited on finely divided alumina, all of which passes through 200 mesh and 30% of which is retained on 325 mesh. The silver content of the catalyst powder is 18% by weight. The gas velocity through the contiguous zones is of the order of 1 foot per second and the catalyst is satisfactorily fluidized under these conditions. As in the previous example, a cooling tube bank keeps the upper zone at a temperature of 155° C. and catalyst powder circulating from this zone to the reaction zone makes it possible to hold closely to the desired reaction temperature of 235° C. Contact time in the reaction zone is 4.1 seconds. The yield of recovered ethylene and propylene oxides is 69%.

Experience indicates that with high catalyst activity readily attainable with the fine silver powders that may be employed in my fluidization process the contact or residence time of the reactants within the reaction zone is advantageously less than 5 seconds. In spite of the limited reaction time high conversions are realized.

It has been hereinbefore stated that for efficient operation of the process of this invention not more than 1.0 volume of oxygen should be charged to the reactor for each volume of olefin; this limitation, in effect, prevents inordinate dilution of the reactants by excess oxygen. To avoid material dilution of the reactants by excess olefin, it is advisable to provide not less than 0.4 volume of oxygen with each volume of olefin entering the reaction zone.

It is well to observe that the fluidized catalyst in each of the two contiguous zones is at a uniform, desired temperature and yet the two zones are maintained at substantially different temperature levels. This is made possible by placing restrictions in the flow path of the fluidized mass between the reaction and cooling zones. Thus, grate 2 in the apparatus of Figure 1, while permitting upward flow of the fluidized mass from the lower zone to the upper, prevents substantial slippage of the catalyst particles from the upper zone to the lower. Similarly, the connecting duct 22 between zones 20 and 21 of Figure 2 acts to avoid top-to-bottom mixing of the fluidized catalyst in the contiguous zones and a temperature differential can thus be established therebetween.

Those skilled in the art will visualize many variations of the invention without departing from its spirit or intent. For instance, one or both of the gaseous reactants may be introduced into the reactor at a plurality of vertically spaced points. Recycling of reaction gases may be practiced although this is unnecessary when the process operates under the indicated preferred conditions. Also, particularly with silver catalyst of very high activity, it may be beneficial to admix an inert powder such as graphite or Carborundum with the catalyst particles. Accordingly, the foregoing disclosure should be interpreted as being illustrative of the invention and not restrictive; only such limitations should be imposed as are indicated in the appended claims.

What I claim is:

1. In the vapor phase catalytic process for oxygenation of olefins wherein gaseous reactants comprising essentially olefin and oxygen are passed upwardly through a vertical elongated catalytic zone containing a unitary mass of powdered oxygenation catalyst maintained in fluidized condition; the improvement which comprises, restricting the flow of gaseous reactants intermediate the ends of said catalytic zone and below the psuedo-liquid level of catalyst therein whereby said catalytic zone is divided, without discontinuity of the fluidized catalyst phase, into a lower reaction zone and a contiguous upper cooling zone and upward flow from said lower to said upper zone is permitted but slippage of catalyst particles downward from said upper zone to said lower zone is substantially prevented, maintaining said lower zone at reaction temperature, while maintaining the upper zone at a materially lower temperature such that the reaction in said upper zone is substantially terminated below the pseudo-liquid level of catalyst therein, and withdrawing the gaseous reaction products from said upper zone.

2. The process as defined in claim 1 wherein the catalyst is a comminuated silver catalyst, the olefin and oxygen reactants are proportioned so that there is present from about 0.4 to 1.0 volume of oxygen for each volume of olefin, a reaction temperature in the range of about 200 to 300° C. is maintained in said lower zone and cooled reaction gases are separated from cooled catalyst in said upper zone and said cooled catalyst returned to said lower reaction zone.

3. The process as defined in claim 2 wherein the olefin is predominantly ethylene.

4. The process as defined in claim 2 wherein the olefin is predominantly propylene.

5. The process as defined in claim 2 wherein a stream containing not less than about 50% by volume of ethylene is proportioned with a stream containing not less than about 35% by volume of oxygen so that there is present from about 0.4 to 1.0 volume of oxygen for each volume of ethylene and the thus obtained ethylene and oxygen reactants are introduced into said lower reaction zone, and a reaction temperature in the range of about 220 to 260° C. is maintained in said reaction zone.

6. The process as defined in claim 2 wherein a stream containing not less than about 50% by volume of ethylene and a stream containing not less than about 95% by volume of oxygen are proportioned so that there is present not more than about 0.75 volume of oxygen for each volume of ethylene and the thus proportioned ethylene and oxygen reactants are introduced into said lower reaction zone, and a reaction temperature in the range of about 220 to 260° C. is maintained in said lower reaction zone.

7. In the vapor phase catalytic process for oxygenation of olefins wherein gaseous reactants comprising essentially olefin and oxygen are passed upwardly through a vertical elongated catalytic zone containing a unitary mass of comminuted silver catalyst maintained in fluidized condition; the improvement which comprises restricting the flow of gaseous reactants intermediate the ends of said catalytic zone below the psuedo-liquid level of catalyst therein whereby said catalyst zone is divided, without discontinuity of the fluidized catalyst phase, into a lower reaction zone and a contiguous upper cooling zone and upward flow from said lower to said upper zone is permitted but slippage of catalyst particles downward from said upper to said lower zone is substantially prevented, proportioning a stream containing not less than about 50% by volume of olefin and a stream of oxygen containing gas so that there is present from about 0.5 to 0.75 volume of oxygen for each volume of olefin and introducing the thus proportioned stream of olefin and oxygen reacants into said reaction zone, passing a coolant through the said upper zone to maintain the fluidized mass therein at a temperature materially below reaction temperature, withdrawing the reaction gases from said upper zone and transferring cooled powdered catalyst from said upper zone to the lower zone to effect circulation of said catalyst through said contiguous zones at a rate to maintain said lower zone at a reaction temperature in the range of about 220 to 260° C.

8. The process as defined in claim 7 wherein the olefin stream is predominantly ethylene and the coolant is passed in indirect heat exchange relation with the fluidized mass in the upper zone.

9. The process as defined in claim 7 wherein the olefin stream is predominantly propylene and the coolant is passed in indirect heat exchange relation with the fluidized mass in the upper zone.

10. In the vapor phase catalytic process for converting ethylene to ethylene oxide by direct oxygenation in the presence of a silver catalyst wherein gaseous reactants comprising essentially ethylene and oxygen are passed upwardly through a vertical elongated catalytic zone containing a unitary mass of comminuted silver oxygenation catalyst maintained in fluidized condition; the improvement which comprises restricting the flow of gaseous reactants intermediate the ends of said catalytic zone and below the psuedo-liquid level of catalyst therein whereby said catalytic zone is divided, without discontinuity of the fluidized catalyst phase, into a lower reaction zone and a contiguous upper cooling zone and upward flow from said lower to said upper zone is permitted but slippage of catalyst particles from said upper to said lower zone is substantially prevented, proportioning a stream of not less than about 50% by volume of ethylene and a stream containing not less than about 35% by volume of oxygen so that there is present from about 0.5 to 0.75 volume of oxygen for each volume of ethylene, introducing said reactants in said proportion into said lower reaction zone, passing coolant in indirect heat exchange with the fluidized mass in the upper zone to maintain therein a temperature materially below the reaction temperature, withdrawing the reaction gases from said upper zone, transferring powdered catalyst from said upper zone to a low point in the lower reaction zone to effect circulation of said catalyst through said contiguous zones, flowing an additional coolant in indirect heat exchange relation with the fluidized mass in said lower reaction zone and coordinating the rate of said catalyst circulation and the rate of flow of said additional coolant to maintain said lower reaction zone at a temperature in the range of about 220 to 260° C.

FREDERICK W. SULLIVAN, Jr.

REFERENCES CITED

The following references are of record in the file of this patent:

UNITED STATES PATENTS

| Number | Name | Date |
|---|---|---|
| 2,178,454 | Metzger | Oct. 31, 1939 |
| 2,373,008 | Becker | Apr. 3, 1945 |
| 2,424,086 | Bergsteinsson et al. | July 15, 1947 |
| 2,430,443 | Becker | Nov. 11, 1947 |
| 2,436,160 | Blanding | Feb. 17, 1948 |
| 2,471,104 | Gohr | May 24, 1949 |
| 2,479,496 | Keith | Aug. 16, 1949 |